April 12, 1960 G. LEUTHÄUSER 2,932,263
MULTI-FLOOR BAKING OVEN WITH MOVABLE SUPPORTS
FOR THE GOODS TO BE BAKED
Filed Nov. 20, 1956 4 Sheets-Sheet 1

INVENTOR
GUSTAV LEUTHÄUSER
By Kurt Kelman
AGENT

INVENTOR
GUSTAV LEUTHÄUSER
By Kurt Kelman
AGENT

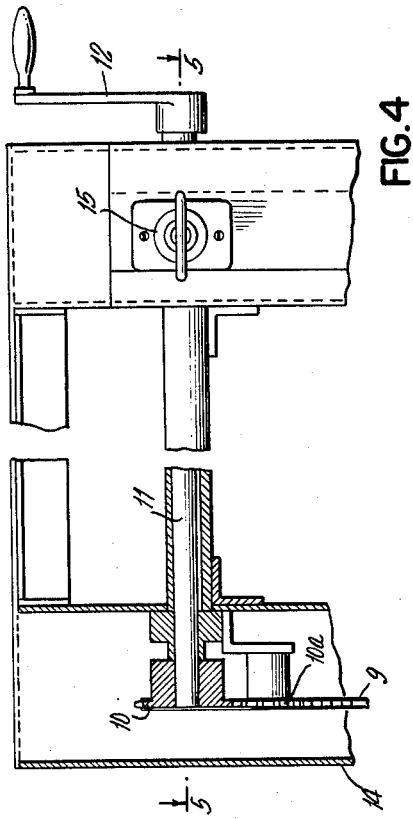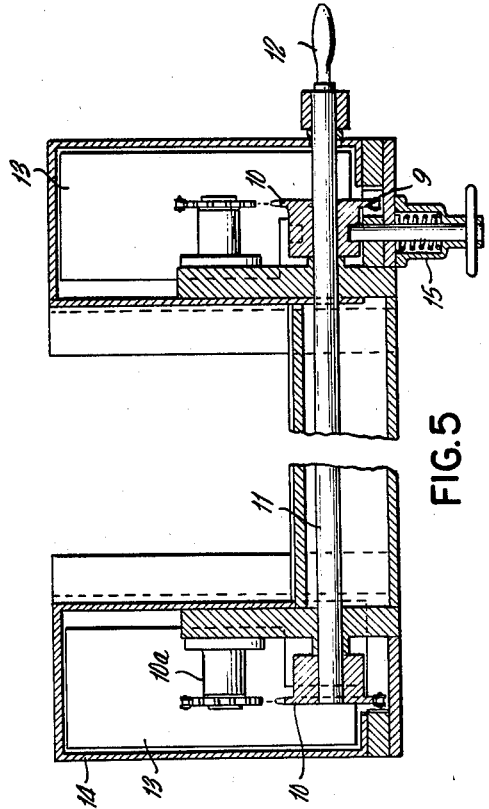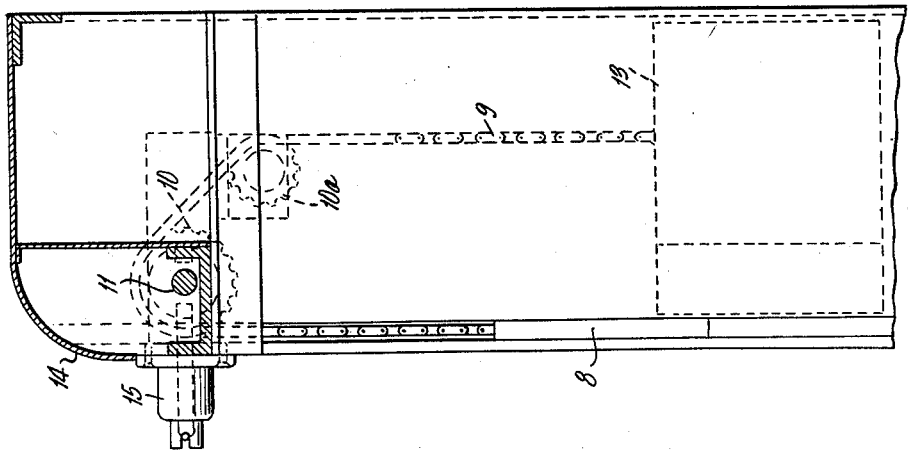

United States Patent Office 2,932,263
Patented Apr. 12, 1960

2,932,263

MULTI-FLOOR BAKING OVEN WITH MOVABLE SUPPORTS FOR THE GOODS TO BE BAKED

Gustav Leuthäuser, Neustadt, near Coburg, Germany

Application November 20, 1956, Serial No. 623,449

Claims priority, application Germany December 3, 1955

7 Claims. (Cl. 107—56)

The present invention relates to multi-floor baking ovens wherein each baking chamber houses a support for the goods to be baked, the supports being movable into and out of their baking chambers.

It is a principal object of this invention to provide baking ovens of this type which are economical in construction cost and space.

It is also an object of the invention to provide ovens of this type whose operation is simple and easy.

Accordingly, I have provided a multi-floor baking oven with a single, movable operating platform which may be selectively placed into position and operated to actuate any one of the movable baking supports at any floor of the oven. The baking supports comprise articulated bands mounted on respective floors in the interior of the oven and means are provided adjacent each articulated band for moving the same into and out of the oven. The operating platform comprises actuating means for the band moving means, which may be coupled with the latter at each floor when the platform is moved to that floor.

The objects, features and advantages of the present invention will become apparent from the following description of a now preferred embodiment thereof, taken in conjunction with the drawings wherein:

Fig. 4 is a detail view in partial section of the means for moving the operating platform and the braking means therefor;

Fig. 5 is a top view thereof, partly in section taken substantially along line 5—5 of Fig. 4, as seen in the direction of arrows; and Fig. 6 is a right-hand end view of Fig. 4 with certain parts broken away.

Figure 3:
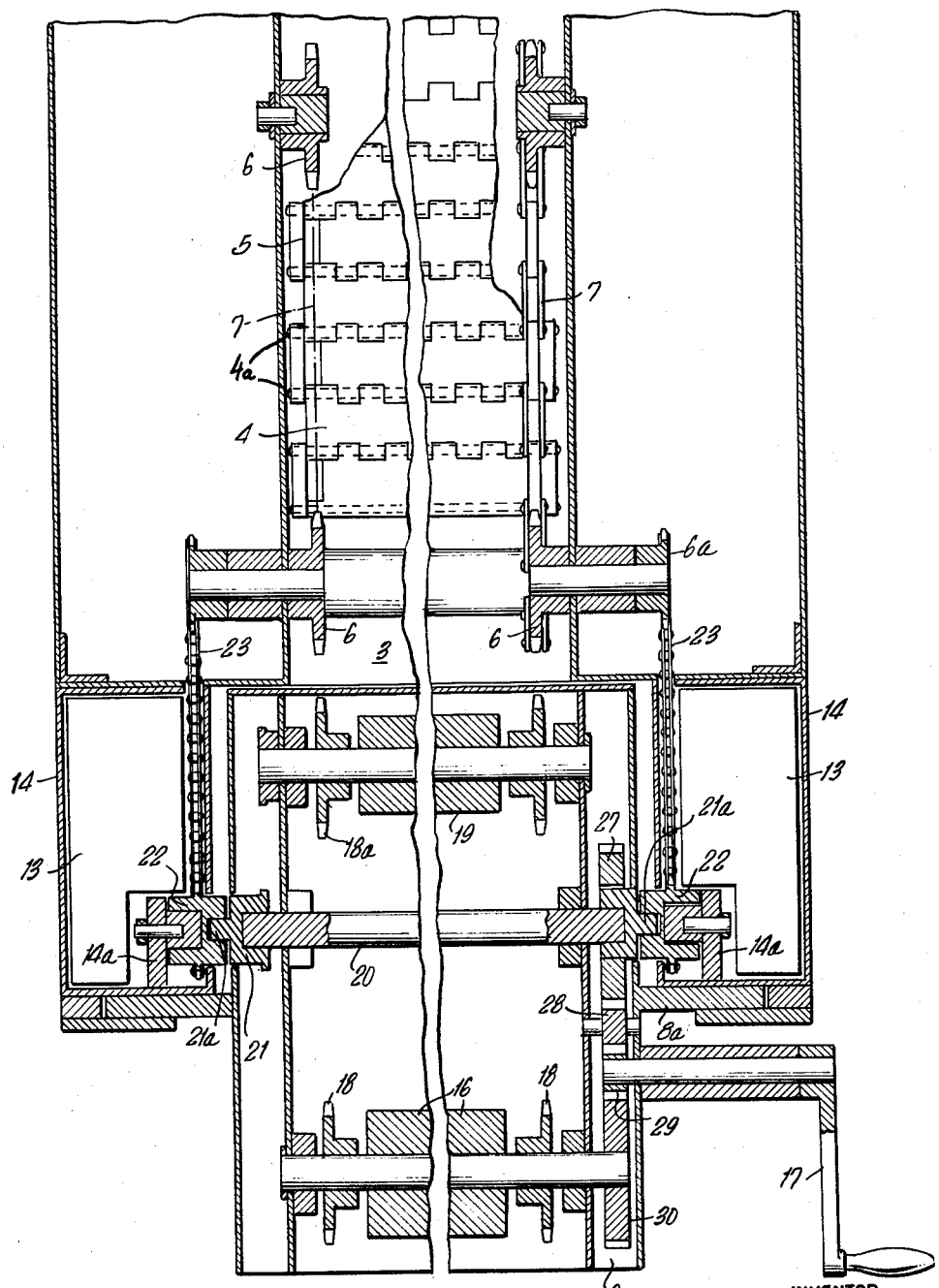
Fig. 3 is a top view of a baking chamber and the operating platform coupled thereto in substantially horizontal section taken along line 3—3 of Fig. 2, as seen in the direction of arrows.

Referring now to the drawings, 1 designates the baking chambers, each chamber being heated from above and below by heating elements 2 of suitable construction embedded in its top and bottom walls. In each baking chamber there is provided a forwardly inclined bottom wall 3 which serves as a support and gliding track for movable baking supports. As shown in Fig. 3, each baking support is constituted by an articulated band 4 whose lateral edges are formed as finite chains 5 having the same height and pitch as band 4. Two pairs of sprocket wheels 6 are journaled at the forward ends of the side walls of each baking chamber and drive sprocket chains 7 meshing with chains 5 of the articulated band 4.

Figure 2:
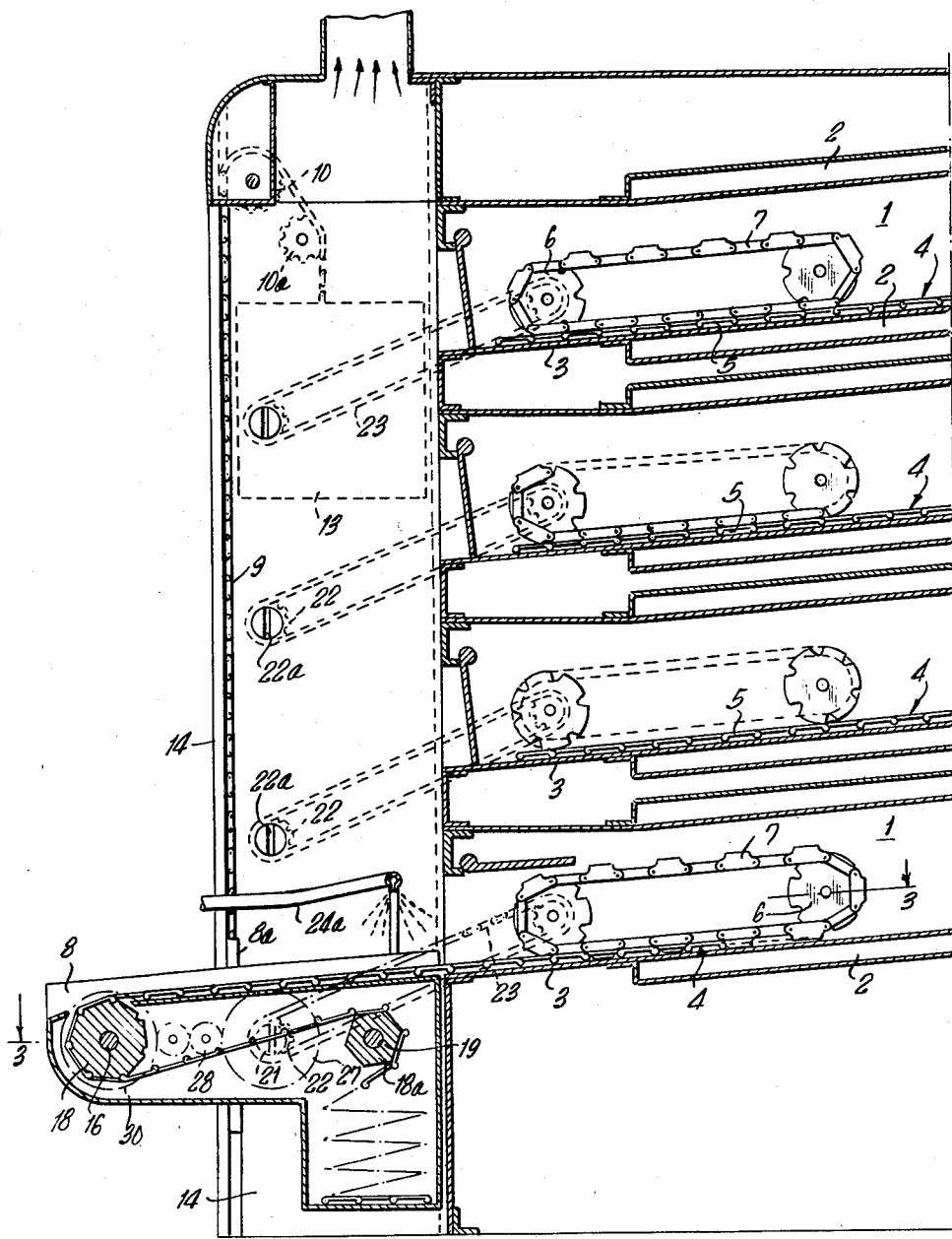
Fig. 2 is a vertical section through the oven shown in Fig. 1, the section being taken substantially along line 2—2, as seen in the direction of arrows.

As seen in Fig. 3, finite chains 5 support band 4 which comprises a series of strips or plates notched at their ends to provide uniformly spaced apertures adjacent to longitudinal edges of each band 4, and chains 7 carry a number of spaced lugs which enter the apertures to move the band 4 into or out of its chamber depending upon the direction of movement of members 7. The strips or plates of each band 4 are connected to each other by hinge pins 4a and normally rest on the bottom wall 3 of the respective chamber 1, as is best shown in Fig. 2. As will be described more particularly hereinbelow, the sprocket chains 7 may be moved from the operating platform forwardly or backwardly whereby the baking support 4 will be pulled out of or pushed into the baking chamber 1. Thus, the operating platform serves to support the goods to be delivered to and discharged from the baking chamber.

The operating platform 8 is suspended on a pair of finite chains 9 connected with one end to lugs 8a of the platform. The chains are supported on sprocket wheels 10 which are mounted on shaft 11 and which may be rotated by crank handle 12 to raise or lower the operating platform to the desired baking chamber 1. Counter-weights 13 are attached to the other ends of the chains 9 which are guided over idler sprockets 10a. The counter-weights are concealed in hollow standards 14 which also serve as guide posts for platform 8. As illustrated in Fig. 3, the latter has a pair of vertical walls which slide along the adjacent surfaces of standards 14 at both transverse ends of the baking chambers. The arrangement of the counter-weights makes it possible to operate the crank handle 12 manually without undue exertion to lift or lower the operating platform.

When the operating platform has been moved to the desired position in front of a baking chamber (see Fig. 2, for instance), it is desirable to hold it in position by a braking device which may be rigidly connected with the hollow standard 14 so that the platform may not be moved out of position without disengagement of the braking device.

A preferred braking device is illustrated in Figs. 4 to 6. As shown, this includes the pin 15 which is receivable in a recess in the hub of sprocket wheel 10 to connect the same rigidly with standard 14 wherein the pin is resiliently mounted. When the pin is in engagement with the sprocket wheel, the same cannot turn and the platform 8 is accordingly held rigidly in position. The number of teeth on sprocket wheels 10 is such that one full rotation of crank handle 12 corresponds exactly to the center distance of one baking chamber to the next.

Once in position in front of a baking chamber, the operating platform functions as follows:

Shaft 20 is coupled to driving sprocket wheels 22 by means of coupling discs 21. Sprocket wheels 22 are journaled in ribs 14a of standards 14, one pair of driving wheels being mounted in a suitable position in front of each baking chamber. The sprocket wheels are provided with diametral channels 22a to accommodate lugs 21a of the coupling discs 21 so as to establish a driving connection between shaft 20 carrying pinion 27 and driving sprocket wheels 22. The driving wheels 22 are in driving connection with sprocket wheels 6a by means of endless chains 23 passing through slots in the rear faces of standards 14, sprocket wheels 6a being mounted on a common axle with sprocket wheels 6.

Pinion 27 is also mounted on axle 20 and meshes with pinion 28 which, in turn, meshes with pinion 29 mounted co-axially with crank handle 17. Pinions 29, 28 and 27 form a gear train actuatable by rotation of the crank handle so as to move the articulated band 4 out of or into the baking chamber, as desired, by turning the handle in one or the other direction. Obviously, the manual operation could be replaced by automatic operation if a small motor is connected to handle 17 to turn the same.

Mounted frontwardly of shaft 20 is a guide roll 16 for a purpose to be explained hereinafter. A pair of sprocket wheels 18, 18 is mounted coaxially with the guide roll on each side thereof and the sprocket wheels and guide roll are rotated by crank handle 17, pinion 30 meshing with pinion 29 to form a gear connection between the handle and the guide roll 16. The sprocket wheels 18 mesh with the chains 5 mounted on the lateral edges of baking surface 4 and engage the chains as soon as the baking surface 4 has reached the roll 16 when the surface is pulled out of the baking chamber. For this purpose, the teeth of wheels 18 are shaped in a manner similar to that of lugs on chains 7 so as to enter the aforementioned apertures in a selected band 4 and drive same in the desired direction. In this manner, the direction of travel of articulated band 4 may be reversed as it turns about roll 16.

Backwardly of shaft 20, there is mounted a guide roll 19 and, coaxially therewith and on both sides thereof sprocket wheels 18a, 18a. Guide roll 19 is also rotated automatically by crank handle 17 and receives the articulated band 4 as it moves out of the baking chamber about roll 16. When chains 5 of band 4 are engaged by sprockets 18a whose teeth are similar to teeth of sprockets 18 so as to enter the apertures in chains 5, the band may either be partially moved back into the oven or it may be piled up after it has passed the roll 19. It may also be wound up thereon. As is shown in Fig. 2, the band 4 in lowermost chamber 1 is displaced by chains 7 along the bottom wall 3 of said chamber and along the upper side of platform 8 to travel over guide rolls 16 and 19 while the chains 5 engage with sprocket wheels 18 and 18a.

Figure 1:
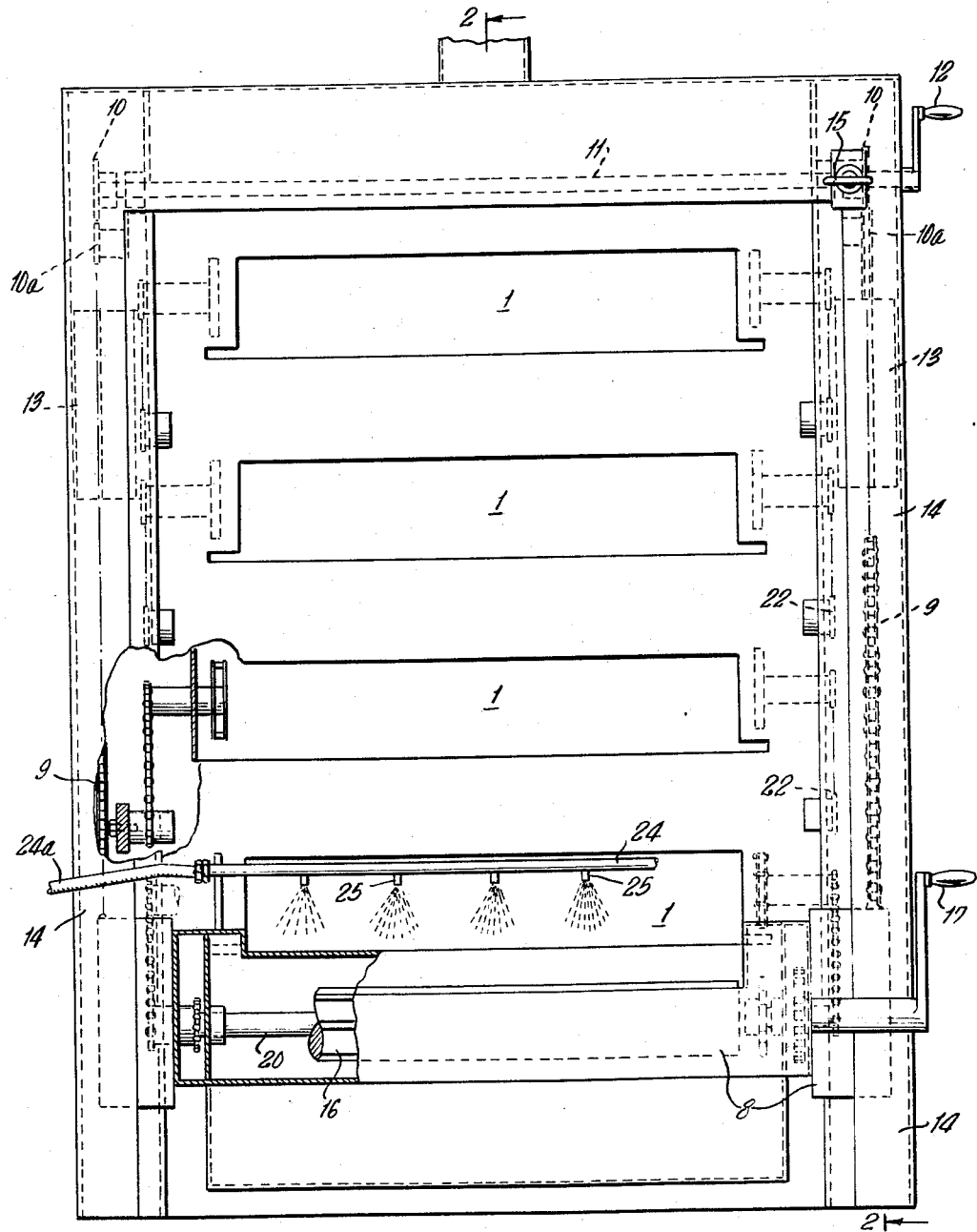
Fig. 1 is a schematic front view of a baking oven with several superposed baking chambers and a single operating platform embodying my invention, certain portions of the platform, of the front wall, and of the left-hand standard being broken away.

It is often desired to keep the outer skin of the goods to be baked elastic and they are, therefore, often brushed with a wet brush. In accordance with one preferred feature of the invention, this operation is combined automatically with the charging of the goods into the oven by providing a water pipe 24 with atomizers 25 on the operating platform so that the goods may be sprayed with water as they are moved into the oven on articulated band 4. Water pipe 24 is connected to a faucet or the like by means of a flexible conduit 24a which is illustrated in Fig. 1.

As will be clear from the above description, the single operating platform of the present invention provides great savings in construction costs and in space. The operation of the baking supports in the superposed baking chambers has been made possible only because the moving chains at the edges of the baking supports are finite and have the same length as the supports themselves, the chains in turn being moved forwardly or backwardly by sprocket chains preferably mounted directly behind the doors of the baking chambers at the front ends thereof.

Since no endless chains are mounted in the baking chambers for connection to the actuating means, chains 23 being mounted outside the chambers, as shown in Fig. 3, the baking chambers may be steam-tightly closed after the baking surface is moved into or out of the baking chamber.

While the invention has been described in detail in connection with a now preferred embodiment thereof, it will be understood that many modifications and variations may occur to the skilled in the art, particularly after benefiting from the present teaching, without departing from the spirit and scope of the invention as defined in the appended claims.

What I claim is:
1. A baking oven having a plurality of superposed baking chambers, an articulated finite band constituting a support for the goods to be baked mounted in each baking chamber for movement in and out of its baking chamber, a single operating platform mounted on said oven for positioning in front of each baking chamber, means for moving the operating platform up and down into selected positions in front of each baking chamber, means in each baking chamber for moving the articulated band therein forwardly and backwardly, means mounted on the operating platform for actuating the second-named moving means in each baking chamber and for guiding and deflecting the band downwardly during backward movement thereof from the baking chamber, and means for coupling the band moving means with the actuating means in each selected position of the platform.

2. The baking oven of claim 1, wherein the moving means for the articulated band comprises a first chain means at each lateral edge of the band, a second chain means meshing with said first chain means and sprocket drive means mounted within the baking chamber for engaging the second chain means and driving the band forwardly and backwardly.

3. The baking oven of claim 2 wherein said means for guiding and deflecting a selected band comprises a first guide roll mounted on said operating platform for receiving and guiding the articulated band as it moves out of the baking chamber and a second guide roll mounted backwardly of the first roll on the platform for receiving the band from the first roll.

4. The baking oven of claim 3, comprising a pair of sprocket wheels mounted at each side of each guide roll and adapted to mesh with the first chain means upon movement of the band outwardly of the baking chamber and contact of the band with the respective guide roll.

5. The baking oven of claim 1, further comprising water spray means comprising conduit means mounted transversely across and on the operating platform, said conduit means having a plurality of discharge orifices.

6. The baking oven according to claim 2, wherein said means for guiding and deflecting a selected band comprises a first guide roll mounted on said operating platform for receiving and guiding the articulated band as it moves out of the baking chamber, a second guide roll mounted backwardly of the first roll on the platform for receiving the band from the first roll, and means for guiding the advancing end of the band at least partially back into its chamber.

7. The baking oven according to claim 2, wherein said means for guiding and deflecting a selected band comprises a first guide roll mounted on said operating platform for receiving and guiding the articulated band as it moves out of the baking chamber, a second guide roll mounted backwardly of the first roll on the platform for receiving the band from the first roll, and means for piling up the portion of the band advancing beyond said second guide roll on said platform.

References Cited in the file of this patent

UNITED STATES PATENTS

| 371,785 | Plummer | Oct. 18, 1887 |
| 1,819,231 | Crawford et al. | Aug. 18, 1931 |
| 2,333,097 | Duboc et al. | Nov. 2, 1943 |

FOREIGN PATENTS

| 69,665 | Norway | Oct. 22, 1945 |